UNITED STATES PATENT OFFICE.

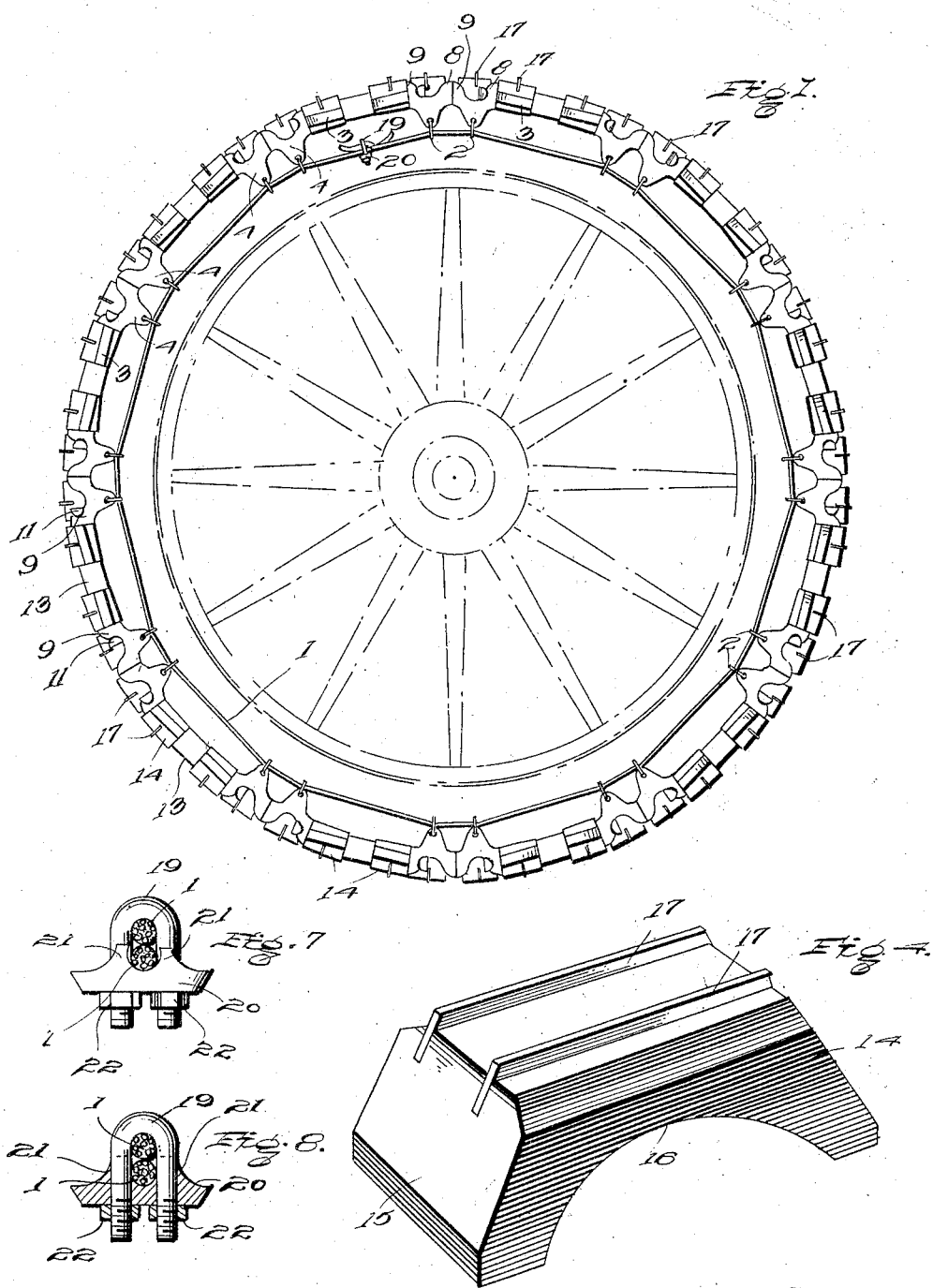

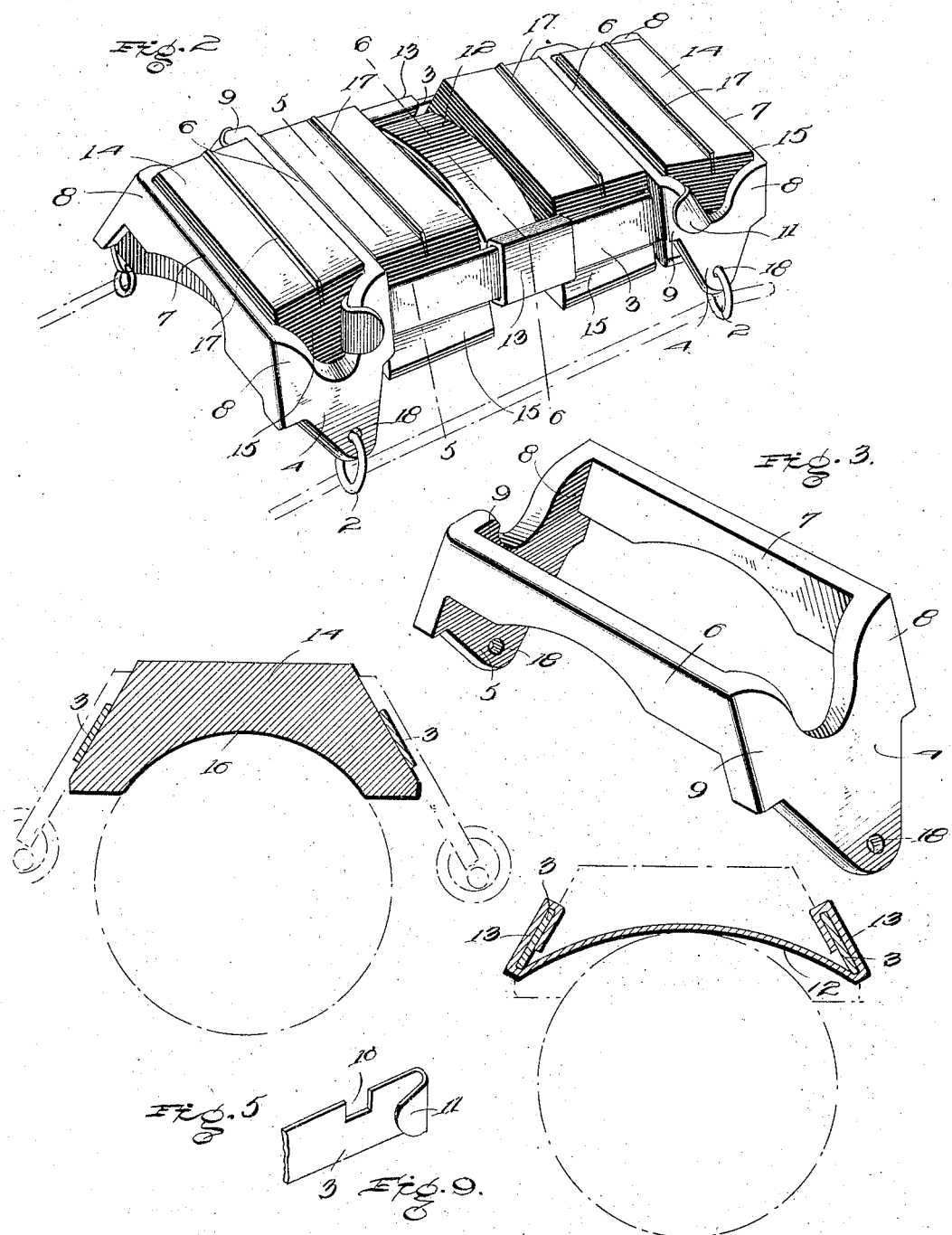

RHODA C. HARRIS, OF PITTSBURGH, PENNSYLVANIA.

TIRE-PROTECTOR.

1,015,178.  Specification of Letters Patent.  Patented Jan. 16, 1912.

Application filed February 21, 1911. Serial No. 609,967.

*To all whom it may concern:*

Be it known that I, RHODA C. HARRIS, a citizen of the United States, residing at Pittsburgh, in the county of Allegheny and State of Pennsylvania, have invented certain new and useful Improvements in Tire-Protectors, of which the following is a specification, reference being had therein to the accompanying drawing.

This invention relates to tire protectors, and the principal object of the same is to provide a protector provided with tread blocks which can be easily removed when desired, but which will be securely held within the protector when in use.

Another object of the invention is to provide an improved means whereby the frames of each section will be rigidly held in spaced relation.

This invention is illustrated in the accompanying drawings, wherein:—

Figure 1 is a side view of a wheel upon which the protector is mounted. Fig. 2 is an enlarged perspective view of one of the sections of this protector. Fig. 3 is an enlarged perspective view of one of the frames of each of the sections. Fig. 4 is an enlarged perspective view of one of the tread blocks used with this protector. Fig. 5 is a sectional view along line 5—5 in Fig. 2. Fig. 6 is a sectional view along the line 6—6 in Fig. 2, the tread block and the tire being indicated by dotted lines. Fig. 7 is an enlarged view of a clamp used in connection with this invention. Fig. 8 is a view similar to Fig. 7, one of the jaws of the clamp being shown in section. Fig. 9 is a view of one end of one of the side bars.

Referring to the accompanying drawings and particularly to Fig. 1 it will be seen that this tire protector comprises a plurality of sections, which are connected together by means of cables 1 which pass through eyes 2 connected with the protector and which hold the protector in close contact with the tire. The protector comprises a plurality of sections each of which is composed of a frame at each end, the frames of each section being connected by means of side bars 3 which hold the frames in spaced relation. Each of the frames comprises a pair of end walls 4 and 5, which are angularly disposed with respect to each other, and which are connected by means of the bars 6 and 7 so that a substantially rectangular frame work is formed which is smaller at the outer end than at the inner end. Each of the end walls is provided with a central recess leading from the outer edge thus forming a pair of side lugs 8 and 9, the lugs being of greater depth than the connecting bars 6 and 7. The side bars 3 are provided at each end with a notch 10 in which the connecting bars 6 fit. The end portion 11 of each of the side bars 3 is bent around the lug 9, so that the bars and links are rigidly held together, and the frames held in spaced relation. It should be noted however, that the lugs are of greater depth than the connecting bar, so that when it is desired to remove one of the frames the side bars can be drawn along the lugs until the connecting bar passes out of the notch. A web 12 connects the side bars 3 intermediate their length and has its central portion curved to conform to the contour of a tire. The web has its end portions 13 bent up the outer sides of the side bars, over the top edge, and down the inner sides so that the connecting web which braces the side bars can be slid along the bars.

The tread blocks 14 used in this invention are preferably formed of wood and are provided with sloping end faces 15 which are positioned at approximately the same angle as the end walls 4 of the frames, so that when the tread blocks are placed within the frames they will be tightly wedged in place and cannot possibly become loose and get lost as the tire comes in contact with the inner faces and keeps them in place. The inner faces 16 of the blocks are curved so that the blocks will fit the contour of the tire and will be more rigidly secured in place. In the section shown in Fig. 2 there are shown four blocks in use, two of which are in the end frames and the remaining two held between the side bars. These blocks which are held between the side bars are held in place by means of the side bars and connecting web. The side bars are secured to the lugs 9 and are thus positioned on an incline so that the blocks which are positioned between the side bars are held in place in the same wedging manner as the blocks which are positioned within the end frames. If desired the side bars can be made longer and two or more of the connecting webs used instead of the one as illustrated, in which case it will be possible to use a greater number of blocks between the frames. The blocks are each provided in their outer faces with transverse slots in which the anti-slipping strips 17 are secured. These strips runs transversely of the tire protector and are preferably formed of metal. Any number of anti-slipping strips may be used in each block; Fig. 2 showing the blocks having one strip apiece, and Fig. 4 showing the blocks with two.

In use the sections are placed around the tire and the cable 1 is threaded through the eyes 2 which are mounted in the openings 18 formed in the walls of the links. The ends of the cable are passed through a clamp and drawn tight so that the tire protector is rigidly held upon the eye. The clamp shown in this application comprises a U-shaped member 19, which has its ends threaded for a portion of their length. A plate 20 is slidably mounted upon the arms of the U-shaped member and is provided with lugs 21 which extend along the arms of the U-shaped member. The ends of the cable are passed through the clamp between the plate 20 and the U-shaped member and between the arms of the U-shaped member. Nuts 22 are threaded upon the arms of the U-shaped member and when tightened move the plate along the arms and tightly clamp the cable so that the same is held rigidly in place. It should be noted that by means of having the protector constructed in this manner the frames can be easily removed if broken without damaging the side bars and also that the tread blocks can be very readily removed when desired as they are simply held in place by the wedging effect of the frames and side bars.

What I claim is:—

1. A tire protector comprising a plurality of sections, each of said sections comprising end frames, side bars holding said frames in spaced relation, a web connecting said side bars intermediate their length, and tread blocks carried by said frames and by said side bars between said frames and said web.

2. A tire protector comprising a plurality of sections, each of said sections comprising end frames, side bars rigidly secured to said frames and holding said frames in spaced relation, a connecting web slidably mounted upon said side bars and tread blocks carried by said frames and by said bars between said links and web.

3. A tire protector comprising a plurality of sections, each of said sections comprising end frames, side bars, said bars provided with notches near their end portions to receive portions of said frames, the end portions of said bars bent around said links, and tread blocks carried by said sections.

4. A tire protector comprising a plurality of sections, said sections having end frames, each of said frames having outwardly converging side walls, webs connecting said walls, outwardly converging side bars connecting the frames of each of said sections and tread blocks fitting within said frames and between said bars, the ends of said blocks being outwardly converging to cause the blocks to be held within said frames and between said bars.

5. A tire protector comprising a plurality of sections, said sections comprising end frames, side bars connecting said frames, a bracing band connecting said bars and conforming to the contour of a tire, and tread blocks carried by said sections.

6. A tire protector comprising a plurality of sections, said sections comprising end frames, each of said links comprising end walls, lugs formed upon walls, bars connecting said walls, side bars connecting the frames of each of said sections, said side bars having notches adjacent the end portions to receive the bars of said frames, the end portions of said side bars bent around the lugs of said walls, and tread blocks carried by said sections.

7. A tire protector comprising a plurality of sections, each section comprising frames, bars connecting said frames, bracing bands connecting said bars intermediate their length and tread blocks carried by said sections.

8. A tire protector comprising a plurality of sections, each section comprising frames, bars connecting said frames, a bracing band connecting said bars and slidably mounted thereon and tread blocks carried by said sections.

In testimony whereof I hereunto affix my signature in presence of two witnesses.

RHODA C. HARRIS.

Witnesses:
ERNEST BRADSHAW,
JOHN D. HARLEY.